United States Patent [19]
Gustin

[11] Patent Number: 5,753,835
[45] Date of Patent: May 19, 1998

[54] RECEPTACLE FOR HOLDING A SENSING DEVICE

[75] Inventor: Ronald R. Gustin, Washington, Ill.

[73] Assignee: Caterpillar Inc., Peoria, Ill.

[21] Appl. No.: 764,432

[22] Filed: Dec. 12, 1996

[51] Int. Cl.$^6$ .............................. G01K 1/08; G01D 21/00
[52] U.S. Cl. ...................... 73/866.5; 73/204.22; 374/208
[58] Field of Search ............................. 73/115, 866.5, 73/864.14, 756, 204.22, 273, 861.65; 374/208; 128/662.03

[56] References Cited

U.S. PATENT DOCUMENTS

| | | | |
|---|---|---|---|
| 4,575,705 | 3/1986 | Gotcher | 374/208 |
| 4,595,301 | 6/1986 | Taylor | 374/208 |
| 4,842,419 | 6/1989 | Nietert | 374/208 |
| 5,632,557 | 5/1997 | Simons | 374/208 |

*Primary Examiner*—Richard Chilcot
*Assistant Examiner*—Harshad Patel
*Attorney, Agent, or Firm*—Mario J. Donato, Jr.

[57] ABSTRACT

A receptacle 10 for holding a sensing device 15 and a method for controllably connecting a housing 20 and a probe 25 together to form the receptacle 10 is disclosed. The receptacle 10 is disposed along a longitudinal axis. The housing 20 has a first end portion 30 and a second end portion 35. The housing 20 also has a bore 37 disposed along the longitudinal axis that extends through the housing 20 and through both end portions 30, 35. Located near the first end portion 30 is a counter bore 43 that defines a step section 40. The probe 25 has a sensing end portion 50 and an attaching end portion 55. Located at the attaching end portion 55 is a flange portion 60. The probe 25, also has a bore 53 disposed along the longitudinal axis and through the attaching end portion 55. Extending near the first end portion 30 of the housing 20 is a lip 45 which has an open position and a closed position. With the lip 45 in the open position, the flange portion 60 can be inserted into the counter bore 43 until it rests near the step section 40. The lip 45 is moved over the flange portion 60 of the probe 25, which connects the housing 20 and the probe 25 together.

11 Claims, 3 Drawing Sheets

# RECEPTACLE FOR HOLDING A SENSING DEVICE

TECHNICAL FIELD

This invention relates generally to an apparatus and method for a receptacle for holding a sensing device, and more particularly to an apparatus and method for a receptacle for holding a sensing device, the receptacle including a housing and a probe.

BACKGROUND

Receptacles are devices typically designed for holding a sensing device. Also, the receptacle may be used for preventing the sensing device from being exposed to possibly damaging elements, such as fluids, and for attaching the sensing device to a fixed structure, such as an oil pan. The sensing device typically has a reactive element that responds to a phenomenon, and a communication element that delivers a signal, such as a proportionate current or voltage in terms of which the phenomenon may be measured. Two examples of such phenomenon are a temperature change in oil or a velocity change in air flow. The communication element can be communicating with a variety of devices, two examples being a mechanical gage or an electronic control unit. The receptacle usually is composed of a housing for holding the communication element, and a probe for holding the reactive element.

Currently some receptacles are machined from a single piece of material, such as bar stock. One advantage to this method is the assurance of a leak proof receptacle. One disadvantage to this method is that due to the machining process, the probe walls usually increase in thickness as the probe length increases. Usually, the thicker the probe wall is, the more difficult it is for the reactive element of the sensor device to react to the phenomenon. Another disadvantage of machining a receptacle from a solid piece of bar stock is the waste in material due to the amount of required material removal.

In a two piece receptacle version the probe and the housing are produced as separate units. The two piece version is typically more economical to produce than the one piece version. In addition, it is usually easier to vary the probe size on a two piece version. In the two piece version a housing, usually a fitting, is joined to a probe, typically a tube.

Currently, the most common methods for joining the housing and the probe together are welding, brazing, and press fitting. One problem with welding is the difficulty in visually determining if the weld has completely sealed the connection between the housing and the probe. If the connection is not properly sealed, leakage may occur. Another problem associated with welding is that the process can weaken the metal around the weld area, which may create a potential problem for the receptacle under various vibration conditions. If brazing is used to connect the housing to the probe, there is a potential problem with flux and contamination being left on the device which could cause corrosion to the receptacle and to the electronics in the sensing device.

When a two piece receptacle is connected by press fitting, pressure is used to connect the probe and the housing together. The probe, flared at one end of the tube to a diameter slightly larger than one of the open ends of the housing, is placed inside the housing, non-flared end first. The non-flared end of the probe is pushed out an opening at the connecting end of the housing until the flared end rests against a portion of the interior wall of the housing. A metal sleeve is placed inside the housing to rest against an interior portion of the flared end of the probe. Pressure is placed on the sleeve until the probe is secured to the housing. One problem with this method is that a visual examination of the connection can not determine if enough pressure was used to properly secure the probe to the housing. Each receptacle has to undergo a variety of tests, such as a pressure test which could be time consuming and costly, to determine if the connection between the probe and the housing is complete. Other problems associated with the press fitting method are the high costs involved in making the precisely sized sleeves and the precisely sized end diameter of the housing required for an acceptable pressure connection.

The present invention is directed to overcoming one or more of the problems as set forth above.

DISCLOSURE OF THE INVENTION

In one aspect of the present invention, a receptacle, having a longitudinal axis is provided, the receptacle being adapted to hold a sensing device. The receptacle includes a housing with two ends and a probe with two ends. The housing has a bore along the longitudinal axis and through both ends. One end of the housing has a counter bore which forms a step section in the housing. The probe has a flange portion at one end. A lip, extending from the housing on the same end as the counter bore, is adapted to fasten the flange portion of the probe to the step section of the housing.

In another aspect of the present invention, a method for producing a receptacle including the steps of forming a housing having two ends and a probe having two ends is provided. Included in the method are the steps of forming a housing bore along the longitudinal axis and through both ends, forming a counter bore near one end of the housing, and shaping a lip near the counter bore end of the housing. Also included in the method are the steps of forming a flange portion on one end of the probe, and forming a bore in the probe along the longitudinal axis and through the flange portion end of the probe. The steps of inserting the flange into the counter bore, and moving the lip over the flange portion to make a connection between the housing and the probe are also included.

DESCRIPTION OF THE DRAWINGS

For a better understanding of the invention, reference may be made to the accompanying drawings, in which.

BEST MODE FOR CARRYING OUT THE INVENTION

The present invention provides a receptacle, including a housing and a probe, for holding a sensing device. The receptacle may be used in fluid flow applications, such as sensing the temperature of air, or oil, where a leak proof seal between the probe and the housing connection may be required. Also, the receptacle may be of an economical type produced in large volumes. A quick and easy visual inspection of the connection between the probe and the housing could be used in place of various mechanical forms of testing previously used, which could aid in a lower manufacturing cost.

Figure 1:
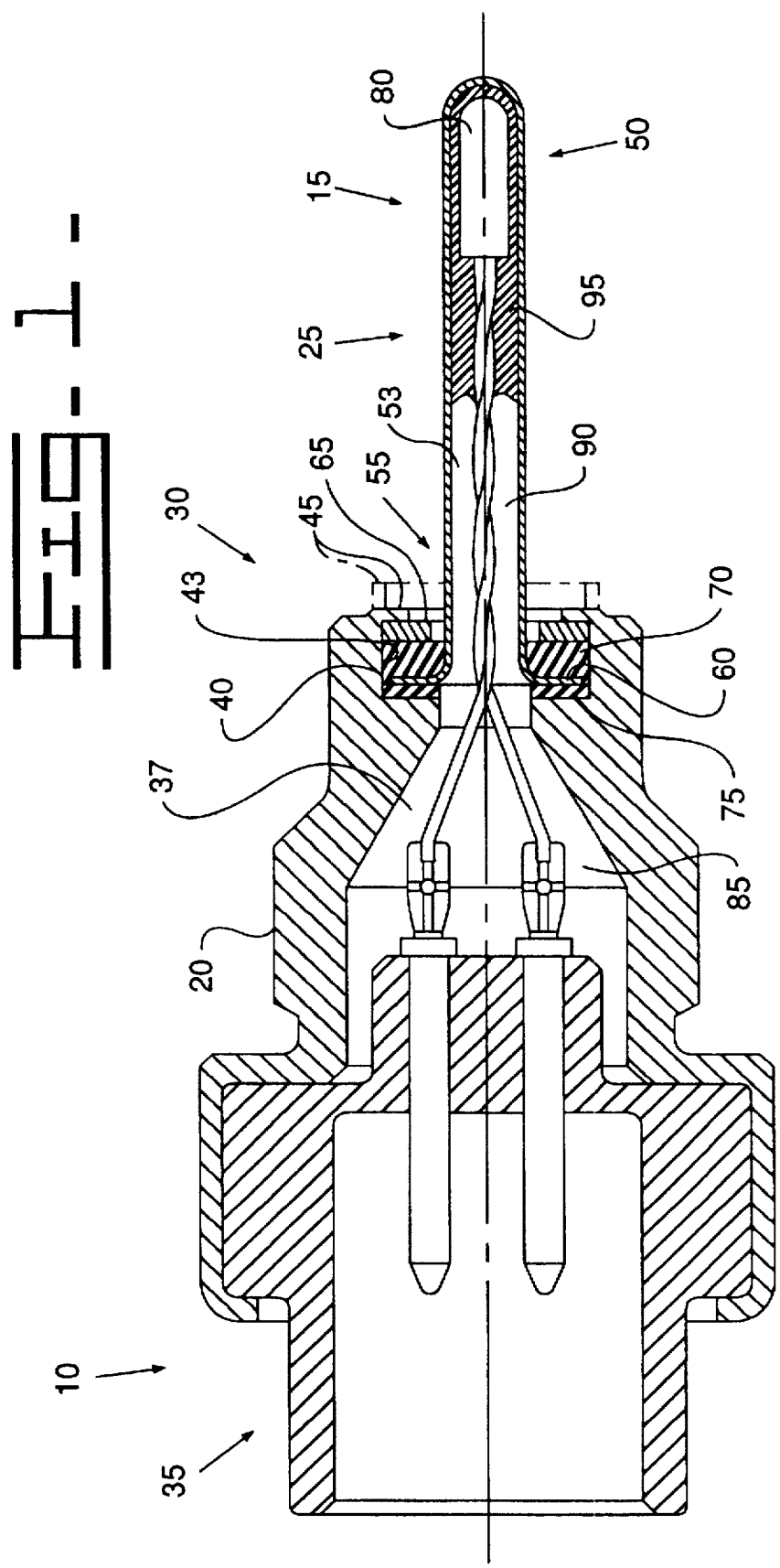
FIG. 1 is a diagrammatic representation of an embodiment of the invention.

FIG. 1 shows a diagrammatic representation of an embodiment of the invention, including a receptacle 10 for holding a sensing device 15. The receptacle 10, having a longitudinal axis, includes a housing 20 and a probe 25. The housing 20 and the probe 25 can be made out of a wide variety of materials, depending on the application.

In the preferred embodiment, the housing 20 has a first end portion 30 and a second end portion 35. The housing 20 includes a bore 37 disposed along the longitudinal axis and through both end portions 30, 35. The housing 20 also includes a step section 40, defined by a counter bore 43 disposed along the longitudinal axis, located near the first end portion 30. A lip 45 extends from the housing 20 in a continuous form on the periphery of the first end portion 30. The open position of the lip 45 is shown in a phantom line and the closed position of the lip 45 is shown in a solid line.

The probe 25 has a sensing end portion 50 and an attaching end portion 55. The probe 25 includes a bore 53 disposed along the longitudinal axis and through the attaching end portion 55. A flange portion 60, located at the attaching end portion 55, extends approximately transversely outward relative to the longitudinal axis. Although a preferred embodiment is described as including the flange portion 60 being substantially transverse to the longitudinal axis, it will be appreciated by those skilled in the art that other suitable flange orientations can be readily and easily used without deviating from the spirit and scope of the present invention.

Figure 2:
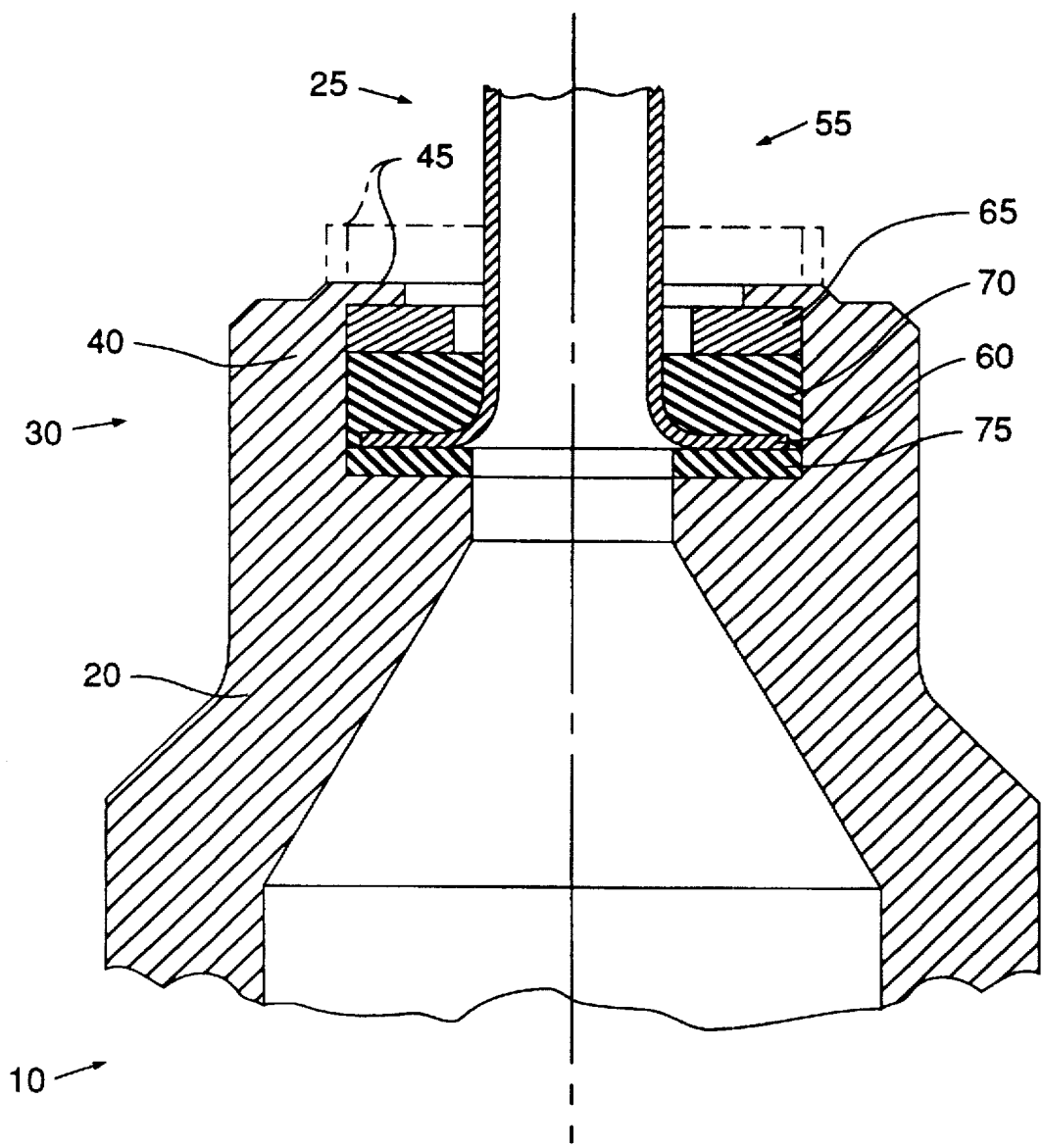
FIG. 2 is an enlarged view of a portion of the diagrammatic representation of an embodiment of the invention.

FIG. 2 shows an enlargement of the diagrammatic representation of an embodiment of the invention, including a retainer member 65, a seal member 70, and an insulator member 75. The retainer member 65, located between the lip 45 and the flange portion 60, aids the lip 45 in holding the seal member 70 in place. The seal member 70 is located between the retainer member 65 and the flange portion 60. The seal member 70 aids in preventing leaks at the connection between the probe 25 and the housing 20. Also, the seal member 70 may aid in thermally insulating the housing 20 from the probe 25. The composition of the seal member 70 will depend on the application and the medium being sensed. In the preferred embodiment an o-ring of the type readily available on the market is used for the seal member 70.

The insulator member 75 may be located between the step section 40 and the flange portion 60. The insulator member 75, when used in a temperature sensing application where the housing 20 is exposed to a temperature different from the probe 25, is used to reduce the thermal exchange from the housing 20 to the probe 25. The insulator member 75 could be made of a ceramic material, a plastic material, or any other suitable insulating material.

Referring back to FIG. 1, the sensing device 15 is of a type and size commercially available, and is dependent on what is being sensed. Three examples of appropriate sensing devices 15 for the receptacle 10 are a thermocouple, a thermistor, and a thin film resistance temperature device. The sensing device 15 consists of a reactive end portion 80 located near the sensing end portion 50 of the probe 25, and a communication end portion 85 located in the housing 20.

To aid in insulating the sensing device 15 from the receptacle 10, prior to connecting the housing 20 to the probe 25, a thermal insulating filler 90 may be placed between the sensing device 15 and the housing 20 and the probe 25. Also, to possibly increase the sensitivity of the reactive end portion 80, prior to connecting the housing 20 to the probe 25, a thermally conductive filler 95 may be placed between the reactive end portion 80 of the sensing device 15 and the sensing end portion 50 of the probe 25. The reactive end portion 80 is located in the probe bore 53 near the sensing end portion 50 of the probe 25. Each of the fillers 90, 95 is of a type that is commercially available.

One method for connecting the housing 20 and the probe 25 together is to first insert the flange portion 60 into the housing counter bore 43 until it rests against the step section 40. Next the lip 45, which extends from the housing 20 in the open position as shown by the phantom line, is moved over the flange portion 60 in a manner which secures the probe 25 to the housing 20, as shown in the closed position by the solid line. In the preferred embodiment, prior to the lip 45 being moved over the flange portion 60, the seal member 70 is placed over the flange portion 60. The retainer member 65 is then placed over the seal member 70. The lip 45 is next moved over the retainer member 65. In this process, the seal member 70 is pushed against the flange portion 60 and the walls of the step section 40, producing a leak proof connection between the probe 25 and the housing 20. Also, an insulator member 75 may be placed between the step section 40 and the flange portion 60 prior to the lip 45 being moved over the flange portion 60.

Figure 3:
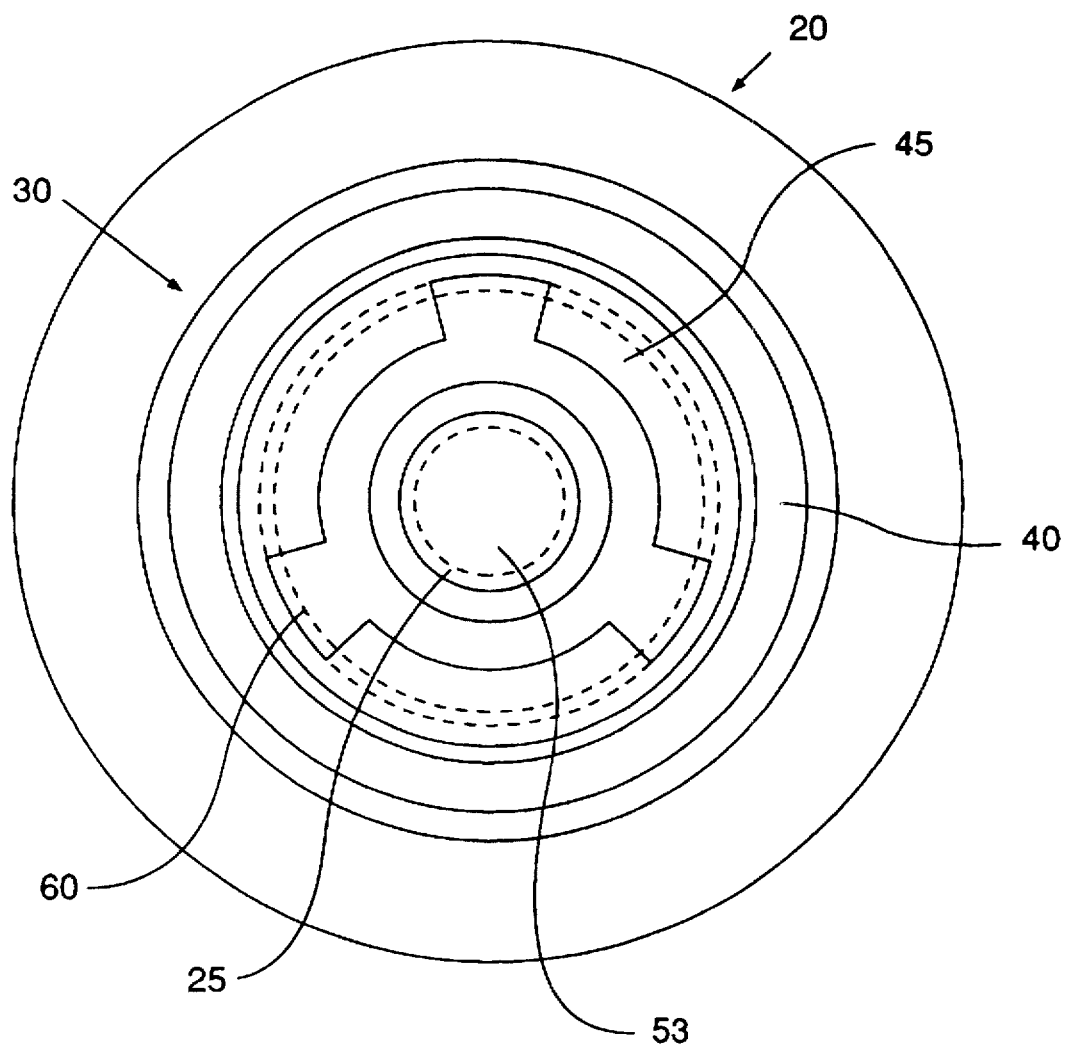
FIG. 3 is a diagrammatic representation of a top view of an alternative embodiment of the invention.

FIG. 3 shows an alternative embodiment of the lip 45 extending from the housing 20. The closed position of the lip 45 is shown in a segmented form on the periphery of the first end portion 30. It will be appreciated by those skilled in the art that other suitable segmented forms of the lip 45 can be readily and easily used without deviating from the spirit and scope of the present invention.

INDUSTRIAL APPLICABILITY

In the preferred embodiment of the present invention, a receptacle 10 for holding a sensing device 15 includes a housing 20 and a probe 25. The sensing device 15 is dependent on the application. The probe 25 has a flange portion 60 located near an attaching end portion 55. Proximal a first end portion 30 of the housing 20 is a step section 40 defined by a counter bore 43. Also, a lip 45 extends from the periphery of the housing 20 proximal the first end portion 30. The flange portion 60 is inserted into the counter bore 43 until it rests near the step section 40. The lip 45 is moved over the flange portion 60 in a manner which sandwiches the flange portion 60 between the step section 40 and the lip 45 of the housing 20 to form a connection.

By using this method to connect the probe 25 to the housing 20, a visual inspection may be used to determine if the connection is complete. Also, the size tolerances of the flange portion 60 and the step section 40 do not have to be as precise as the size tolerances required by other methods of connecting the housing 20 to the probe 25. In addition, the receptacle 10 does not contain any corrosion causing flux or contaminants, created by methods such as welding or brazing the housing 20 to the probe 25. The method of the present invention produces a receptacle 10 that is clean of contaminants, easy to produce in large quantities, and that may be visually inspected.

Additional features may be included between the step section 40, the flange portion 60, and the lip 45, depending on the application the receptacle 10 will be subjected to. Examples of additional features include a seal member 70, a retainer member 65, an insulator member 75, a thermal insulating filler 90, or a thermal conductive filler 95.

Other aspects, and features of the present invention can be obtained from a study of the drawings, the disclosure, and the appended claims.

I claim:

1. A receptacle for holding a sensing device, said receptacle having a longitudinal axis, comprising:

a housing having a first end portion, a second end portion, a bore disposed along the longitudinal axis through the first end portion and through the second end portion, the housing having a counter bore disposed along the longitudinal axis proximal to the first end portion, the counter bore defining a step section;

a probe having a sensing end portion, an attaching end portion, and a bore disposed along the longitudinal axis through the attaching end portion;

a flange portion connected to the probe proximal to the attaching end portion; and a lip connected to the housing at the first end portion, the lip being adapted to fasten the flange portion of the probe to the step section of the housing.

2. The receptacle, as set forth in claim 1, wherein said flange portion is extended approximately transversely outward relative to the longitudinal axis.

3. The receptacle, as set forth in claim 1, wherein said sensing device has a reactive end portion and a communicating end portion, said reactive end portion being in the probe bore proximal to the sensing end portion, and the communicating end portion being in the housing bore.

4. The receptacle, as set forth in claim 1, including an insulator member located between the flange portion of the probe and the step section of the housing.

5. The receptacle, as set forth in claim 1, including a retainer member located between the flange portion of the probe and the lip of the housing.

6. The receptacle, as set forth in claim 5, including a seal member located between the retainer member and the flange portion.

7. The receptacle, as set forth in claim 1, including a seal member located between the flange portion of the probe and the lip of the housing.

8. The receptacle, as set forth in claim 1, including a thermal insulating filler in the probe bore.

9. The receptacle, as set forth in claim 1, including a thermal conductive filler in the probe bore proximal the sensing end portion, and a thermal insulating filler in the probe bore proximal the attaching end portion.

10. The receptacle, as set forth in claim 1, wherein said lip is continuous on the periphery of the first end portion.

11. The receptacle, as set forth in claim 1, wherein said lip is segmented on the periphery of the first end portion.

* * * * *